Feb. 21, 1967   J. H. HOPKINS   3,305,254
SNAP-IN ROD CONNECTOR
Filed May 4, 1964

INVENTOR.
Joseph Henry Hopkins
BY Paul Fitzpatrick
ATTORNEY

United States Patent Office 3,305,254
Patented Feb. 21, 1967

3,305,254
SNAP-IN ROD CONNECTOR
Joseph Henry Hopkins, Warren, Ohio, assignor to General Motors Corporation, Detroit, Mich., a corporation of Delaware
Filed May 4, 1964, Ser. No. 364,363
3 Claims. (Cl. 287—111)

This invention relates to a connector for rod sections and more particularly to a snap-in connector having a split main body portion with internal detents for snap coupling of rod ends.

In automobiles, control rods for operating carburetor linkages, heater dampers, or the like, often present problems in assembly operations of connecting the rods through a body panel or in areas of the engine compartment hard to work in. Experience has shown that the conventional metal clips and clamps normally used for this purpose are difficult to maneuver and often are tedious to assemble under blind or tight working conditions.

The purpose of this invention is to provide an easy to assemble, one piece resilient connector which overcomes these problems. This connector has a sleeve type body with a generally U-shaped cross section. The open end of the U is adapted to be sprung apart when the rod sections are inserted into the sleeve and then snap back into holding relationship. The point of greatest stress from bending occurs at an appropriate distance from the main sleeve diameter so as to give considerable deflection with little effort during assembly.

Referring to the drawings.

Figure 1:
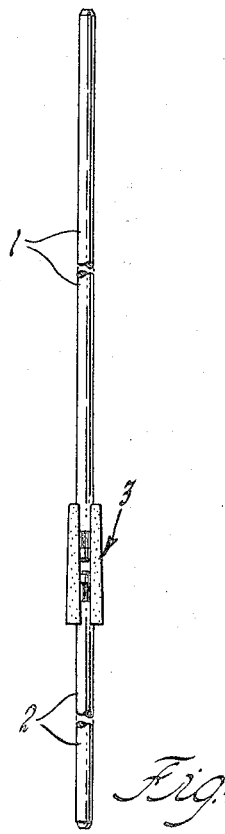
FIGURE 1 is an assembly view showing the inventive connector and rod sections joined on a common axis.
Figure 2:
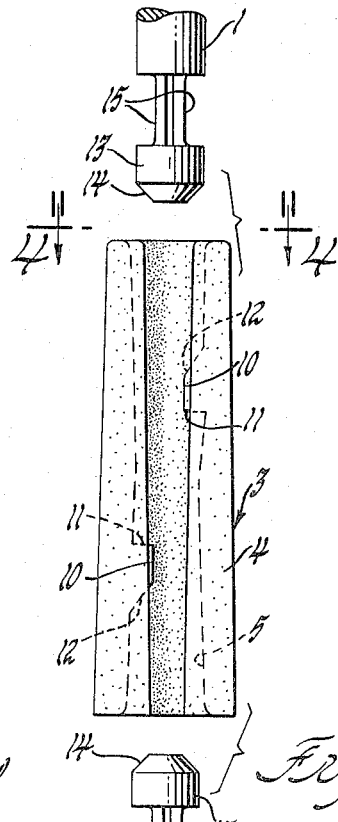
FIGURE 2 is an enlarged view of the connector and rod ends.

Referring to FIGURE 1, rod sections 1 and 2 which are to be joined on a common axis are inserted in the sleeve connector 3 from opposite ends thereof. The ends of the rods are adapted to trigger the connector into holding them against withdrawal.

In more detail, referring to FIGURES 2 through 6, the novel connector 3 comprises a sleeve shaped body having a generally U-shaped cross section which includes rod receiving portion 4 through which extends a main bore 5 tapering slightly inwardly toward the center from the opposite ends of the connector and having an average diameter corresponding closely to the diameter of the rod but being less near the center to insure tight fit. The tapers on the other wall surfaces of the connector facilitate manufacturing by conventional molding techniques. Offset to the rear of the rod receiving portion is a sub-diameter portion 7 having a channel 8 paralleling the main bore 5 which is also slightly tapered from the center similar to the main bore. Preferably, the average diameter of the channel 8 is approximately half the average diameter of the bore 5 with the axes of the channel and bore lying in a common plane which bisects the connector. A pair of axially spaced detents 10 formed on opposite walls of the bore 5 have perpendicular and inclined faces 11 and 12 respectively which snap fasten with the ends of rods 1 and 2.

Figure 3:
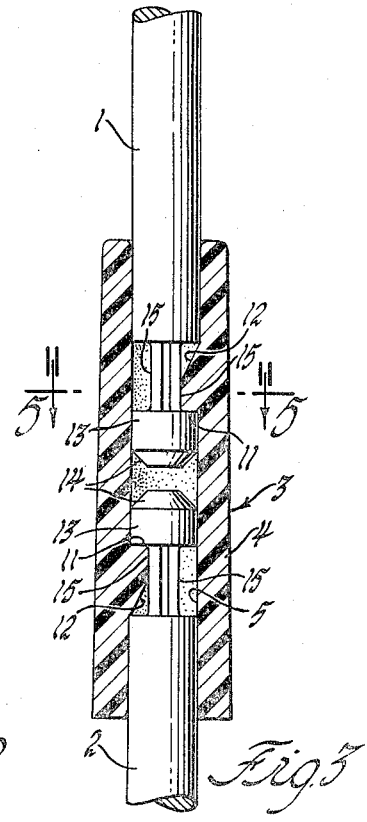
FIGURE 3 is an enlarged longitudinal sectional view of the connector showing the rods in assembled position.
Figure 4:
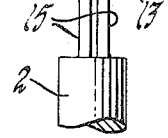
FIGURE 4 is an end view of the connector taken along the line 4—4 of FIGURE 2.
Figure 5:
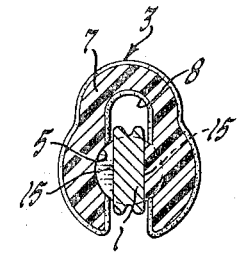
FIGURE 5 is a cross sectional view of the rod and connector taken along line 5—5 of FIGURE 3.
Figure 6:
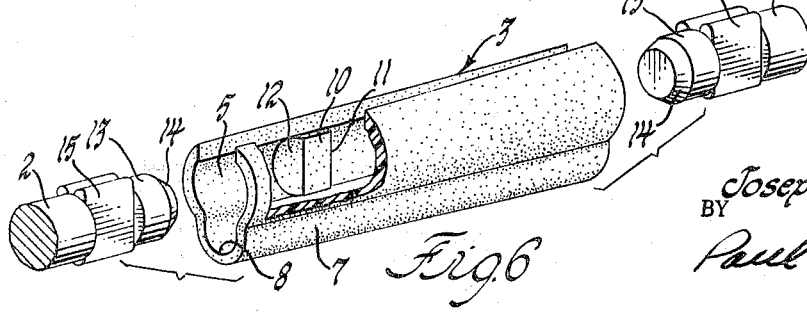
FIGURE 6 is a perspective view of the connector with a wall portion broken away to show one detent.

Each rod has a head portion 13 with a chamfered face 14. Back-to-back cross slots 15 behind the head portion 13 receive the detents and secure the rods against withdrawal as shown in FIGURE 3. Two cross slots are used simply to avoid difficulty in having to sight down the bore if only one slot were used.

In assembling the two rod sections, the connector is sprung apart when the chamfered faces 14 push against the inclined faces 12. When the head portions 13 pass the perpendicular faces 11, the spread legs of the U spring back to the natural unstressed condition and the detents lock in one of the slots 15 holding the rods against further axial movement. It is important to note that the legs of the U do not absorb any stress. The point of greatest stress from bending occurs in the sub-diameter portion. This insures that the springiness of the connector will not be lost from repeated assembly and disassembly of the rods. The connector may be made of any suitable material having natural resilient properties when stressed. Preferably, however, a tough, hard, plastic material is used which can be molded into a permanent shape.

Obviously changes in design can be made without departing from the invention as defined by the appended claims.

I claim:

1. A snap-in rod connector having a dual axis sleeve type body of generally U-shaped cross section adapted to receive and hold a rod having substantially parallel slots and radially extending projections between the slots adjacent one end thereof, comprising in combination:
    a main diameter portion having a longiutdinally split wall and substantially corresponding to the diameter of a rod to be inserted therein,
    a radially projecting detent means on the inner wall of the main diameter portion adjacent each end of the sleeve, with each detent means being on the opposite side of the axis of the main diameter portion adjacent each end of the sleeve, with each detent means being on the opposite side of the axis of the main diameter portion than the other detent means and with a respective detent means adapted to be received in one of said slots for engaging and holding such a rod when inserted, and
    a sub-diameter portion offset from and opening into the main diameter portion opposite the split wall, said sub-diameter portion being of substantially less diameter and operable to flex and absorb any bending stresses occasioned by assembly or disassembly of a rod.

2. A snap-in rod connector according to claim 1 wherein the average diameter of the sub-diameter portion is approximately one-half the average diameter of the main diameter portion.

3. A snap-in rod connector according to claim 1 being formed of a relatively hard, stiff plastic material capable of being molded into a permanent form.

References Cited by the Examiner
UNITED STATES PATENTS

| | | | |
|---|---|---|---|
| 2,654,404 | 10/1953 | Neuhauser et al. | 85—8.8 X |
| 3,182,345 | 5/1965 | Smith | 287—126 X |
| 3,203,717 | 8/1965 | Jahn | 287—111 |

CARL W. TOMLIN, Primary Examiner.

A. V. KUNDRAT, Assistant Examiner.